United States Patent
Ricco et al.

(10) Patent No.: US 7,213,775 B2
(45) Date of Patent: May 8, 2007

(54) FUEL INJECTOR DEVICE FOR AN INTERNAL COMBUSTION ENGINE

(75) Inventors: Mario Ricco, Casamassima (IT); Sisto Luigi De Matthaeis, Modugno (IT); Claudio Amorese, Corato (IT); Dario Manodoro, Orbassano (IT); Raffaele Ricco, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 188 days.

(21) Appl. No.: 11/007,286

(22) Filed: Dec. 9, 2004

(65) Prior Publication Data

US 2005/0127210 A1  Jun. 16, 2005

(30) Foreign Application Priority Data

Dec. 10, 2003  (IT) .......................... TO2003A0990

(51) Int. Cl.
*F02M 59/00* (2006.01)
*F02M 61/20* (2006.01)
*F02M 61/00* (2006.01)
*F02M 47/02* (2006.01)
*B05B 1/30* (2006.01)

(52) U.S. Cl. ................ 239/533.2; 239/533.9; 239/533.12; 239/533.14; 239/585.1; 239/585.2; 239/585.3; 239/585.4; 239/585.5; 239/88

(58) Field of Classification Search ............. 239/533.2, 239/533.9, 533.11, 533.12, 533.14, 585.1, 239/585.3, 585.4, 585.5, 88–93; 251/129.15, 251/129.21, 127
See application file for complete search history.

(56) References Cited

U.S. PATENT DOCUMENTS

| 5,544,816 | A | * | 8/1996 | Nally et al. .............. 239/585.5 |
| 5,758,865 | A |   | 6/1998 | Casey |
| 5,775,599 | A |   | 7/1998 | Smith et al. |
| 5,996,911 | A | * | 12/1999 | Gesk et al. .............. 239/585.1 |
| 6,089,473 | A | * | 7/2000 | Keim .................... 239/533.12 |
| 6,173,915 | B1 |  | 1/2001 | Cohen et al. |

FOREIGN PATENT DOCUMENTS

| JP | 09 170 501 | 6/1997 |
| JP | 09 273 451 | 10/1997 |

* cited by examiner

*Primary Examiner*—Davis Hwu
(74) *Attorney, Agent, or Firm*—Sughrue Mion, PLLC

(57) ABSTRACT

The invention describes an injector device specifically designed for the injection of an alternative fuel such as LPG, methane, hydrogen or others, in an internal combustion engine. In the injector device, the shutter ensuring sealing in closing condition is separated with respect to the metering means with gauged hole, which perform the function of metering fuel during injection, and it is arranged downstream from said metering means. The shutter is controlled by a solenoid, which is again arranged on the downstream side with respect to said metering means.

12 Claims, 3 Drawing Sheets

FUEL INJECTOR DEVICE FOR AN INTERNAL COMBUSTION ENGINE

BACKGROUND OF THE INVENTION

The present invention relates to fuel injector devices for internal combustion engines using an alternative fuel with respect to petrol or diesel oil, such as for instance methane, LPG, hydrogen or other fuels, either in gaseous or liquid state.

In internal combustion engines using alternative fuels such as those referred to above, the fuel is introduced into the intake manifold or engine cylinders by means of injector devices. Said injector devices are currently obtained from petrol injector devices. This is because engines using alternative fuels are not so widespread yet as to justify huge investments that would be required to back up designing activities dedicated to a new type of injector device. As a consequence, injector devices used until today in methane or LPG engines are the result of a compromise and therefore do not meet in an optimal way the specific requirements related to the injection of said alternative fuels. Namely, a main requirement is to adjust the injector device to working pressures related to the use of such fuels, which are far higher than the pressure at which petrol and diesel oil injectors work. For instance, a common petrol injector device injects petrol at a pressure of about 3–4 bars, whereas working pressures of LPG and methane are certainly above 10 bars. On the other hand, an injector device for a fuel such as LPG or methane does not have to meet other requirements that are specific for petrol injection, such as the one related to the particular shape of the injected spray (spray pattern) and to its granulometry. In the case of LPG or methane injection, adulterations of petrol injector devices aiming at obtaining shape and granulometry are useless, being it sufficient to meter the correct amount of fuel during injection.

SUMMARY OF THE INVENTION

The present invention therefore aims at carrying out a fuel injector device whose characteristics are such as to make it optimal specifically for the injection of alternative fuels such as LPG or methane, which is at the same time simple and cheap.

Given this aim, the object of the invention is an injector device comprising:
- a valve body, having an inlet designed to be connected to a source of pressurized fuel and an outlet designed to be connected to an engine intake,
- a shutter cooperating with a corresponding valve seat inside the valve body, so as to check the communication between said inlet and said outlet,
- elastic means holding the shutter in its closing position,
- a solenoid for causing a shift of the shutter towards its opening position,
- metering means with gauged hole for metering the amount of fuel getting out of the injector device when the shutter is open, said injector device being characterized in that said metering means with gauged hole are separated from said shutter and its valve seat.

In the injector device according to the invention there is a separation of fuel metering function, performed through said metering means with gauged hole, from sealing function, performed by the shutter in its closing condition. The main advantage of this feature is that it enables to exploit a further important contrivance, which is also an object of the invention, i.e. said metering means with gauged hole are placed upstream, referring to the fuel flow inside the device, from the aforesaid shutter and its valve seat. Thanks to this contrivance, in the device according to the invention the solenoid control of the shutter is arranged downstream from the aforesaid metering means, i.e. on the low pressure side, thus ensuring an efficient sealing action of the shutter in spite of relatively high fuel supply pressures with respect to petrol injection.

Thanks to the aforesaid characteristics, the injector device according to the invention can also be used with quite high injection pressures, for instance of about 30 bars, which advantageously enables short injection times, short response times in engine transistors, an efficient adjustment and an optimization of strategies for controlling and reducing polluting emissions.

The injector device according to the invention is also characterized by an intrinsic safety function, since in case of faulty working it is kept in closing position by supply pressure and can therefore ensure sealing also up to pressures of 200 bars.

The simpler structure of the device according to the invention with respect to a "petrol"-derived injector device also enables to reduce its size, particularly in axis direction.

As was mentioned above, solenoid arrangement on the low pressure side, where pressure is of about 1 bar, ensures sealing towards outside of the solenoid in a simple and reliable way.

According to a further preferred characteristic of the invention, the solenoid is equipped with a mobile ferromagnetic element for controlling the shutter, which element includes an anchor facing an end of the solenoid, which is attracted by said end when the solenoid is actuated. In an example of embodiment, said anchor is equipped with a pin arranged through the solenoid and pushing the shutter towards its opening position when the solenoid is actuated. In another embodiment, the anchor is connected directly to the shutter body and "pulls" it towards its opening position when the solenoid is actuated.

The metering means with gauged hole are typically made up of a disk or a bushing, with a gauged hole for metering fuel, which is fastened inside the valve body. Said mounting can be carried out in any known manner, but for sake of simplicity it can be carried out for instance by using a spring that holds the disk or bushing inside a seat obtained in the valve body.

BRIEF DESCRIPTION OF THE DRAWINGS

Further characteristics and advantages of the invention will be evident from the following description with reference to the accompanying drawings, provided as mere non-limiting examples, in which.

DETAILED DESCRIPTION OF THE INVENTION

Figure 1:
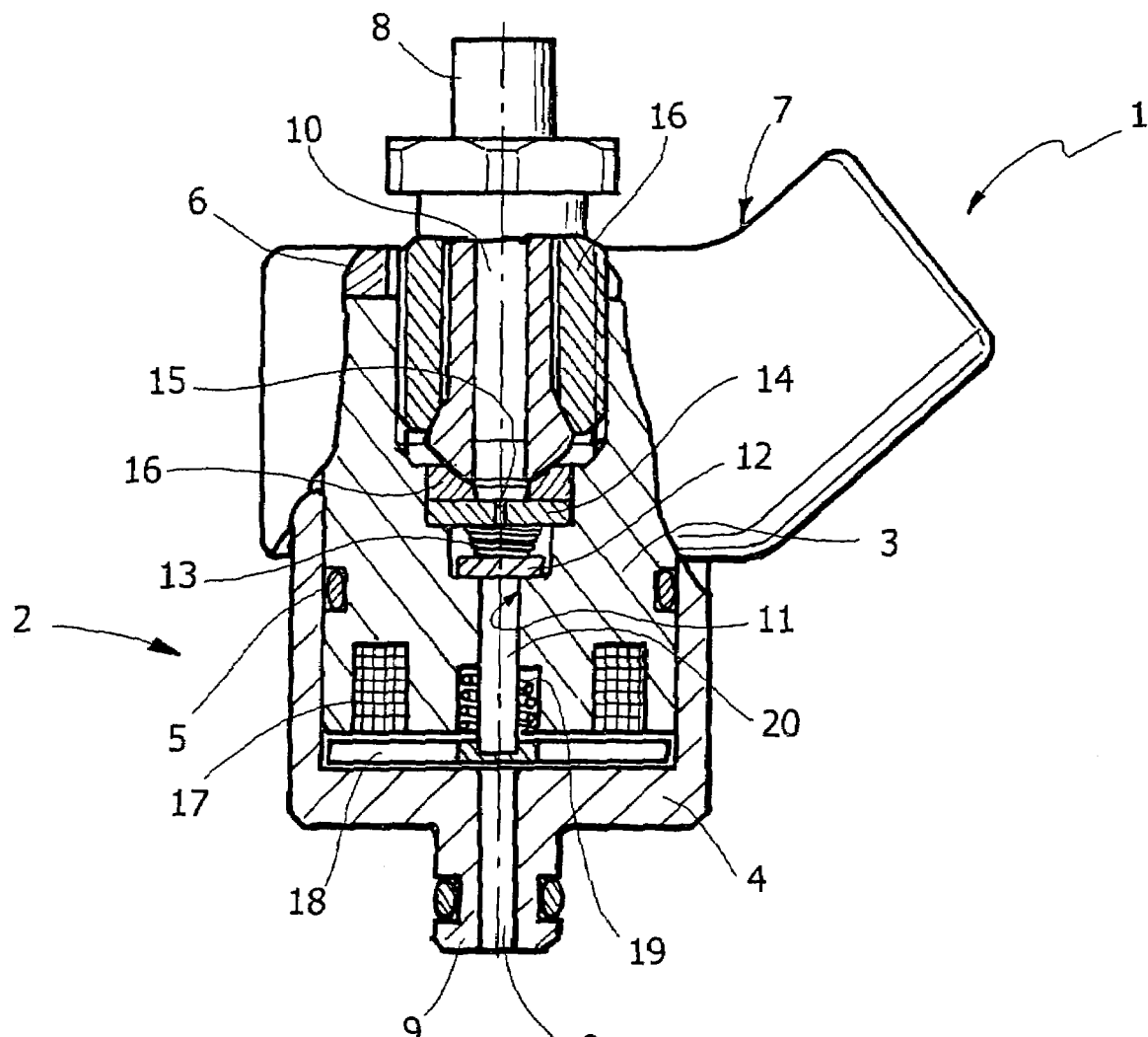
FIG. 1 is a sectioned view of an injector device according to a first embodiment of the invention.

With reference to FIG. 1, number 1 globally refers to a fuel injector device for an internal combustion engine, carried out according to the present invention in order to meet the specific requirements concerning the specific injection of a fuel such as for instance LPG or methane in an optimal manner. The device 1 includes a valve body 1, which in the example shown in the figure comprises a cylindrical element 3 mounted with the interposition of a sealing gasket 5 inside a cup-shaped element 4 and placed axially between said cup-shaped element and the bottom wall 6 of a housing support 7. The device comprises an inlet connection 8 getting out through an opening of the wall 6, and an outlet connection 9 defined by the aforesaid cup-shaped element 4, having a channel 9a.

Still referring to the example shown in the figure, the inlet 8 and the outlet 9 of the device communicate one with the other through a passage including the axial channel 10 inside the connection 8, an axial hole 11 obtained inside the element 3, and the outlet duct defined by the connection 9.

Figure 2:
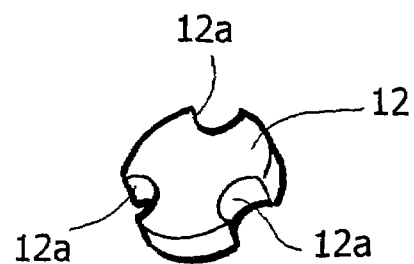
FIG. 2 is a perspective view of a detail of FIG. 1.

The communication between inlet 8 and outlet 9 is controlled by a shutter 12 shaped as a disk with peripheral notches 12a for fluid passage (FIG. 2). The shutter 12 cooperates with the valve seat comprising a ring-shaped abutting surface defined in the wall of the hole 11 of the element 3. It is pushed against said seat by a coil spring 13 placed between the shutter 12 and a disk 14 fastened inside a corresponding seat obtained in the inner hole 11 of the element 3. The disk 14 has a central gauged hole 15 acting as fuel meter during injection. In the example shown in the figure, said disk is held against its seat by a further ring-shaped disk 15, which is again pressed by an inner rounded end of the tubular element making up the connection 8. Said element is blocked in position by a threaded bushing 16 screwed into a corresponding threaded hole of the element 3.

Number 17 refers to a solenoid for controlling the shutter 12. Said solenoid is housed inside a ring-shaped seat obtained in the lower end (with reference to the drawing) of the element 3 and cooperates with a ferromagnetic mobile element made up of an anchor 18, basically disk-shaped with a slightly smaller outer diameter than the inner diameter of the cup-shaped element 4 and facing the lower end of the solenoid 17. The anchor 18 is pushed by a spring 19 towards a lower rest position, and it is attracted against the element 3, against the action of the spring 19, when the solenoid 17 is actuated. The anchor 18 is associated to a bar 20 arranged through the inner hole 11 of the element 3 and pushing with its upper end the shutter 12 towards an opening position against the action of the spring 13, when the solenoid 17 is actuated.

As is evident from the previous description, in the injection device shown in FIG. 1 the fuel metering function is performed by the disk 14 with the gauged hole 15, which is a separate element with respect to the shutter 12, the latter performing conversely the sealing function when the valve is closed. Moreover, the solenoid 17 and the anchor 18 are placed downstream from the gauged hole 15, with reference to fuel flow direction, i.e. on the low pressure side (for instance around 1 bar), which enables to obtain the advantages mentioned above referring to the reduction of the strength required for controlling the shutter 12. The sealing function of the shutter can thus be ensured despite far higher working pressures than in the case of petrol injection. The aforesaid peculiar characteristics of the invention also affect a reduction of the overall size of the device, especially in axial direction. Moreover, the device has an intrinsic safety feature, since in case of faulty working sealing is ensured up to very high pressures of about 200 bars. Obviously, the possibility of working with high injection pressures, for instance in the range of 10 to 30 bars, enables to reduce injection times and therefore to reduce also response times of engine transistors with a more efficient adjustment and an optimization of strategies for controlling and reducing polluting emissions.

Still referring to FIG. 1, it should be pointed out that when the shutter 12 is in its opening position, fuel flows through the channel 10 of the connection 8, through the gauged hole 15 and then through the inner hole 11 of the element 3 until it reaches the outlet channel 9a flowing through holes or passages arranged on the anchor 18 (not shown in the figure).

Figure 3:
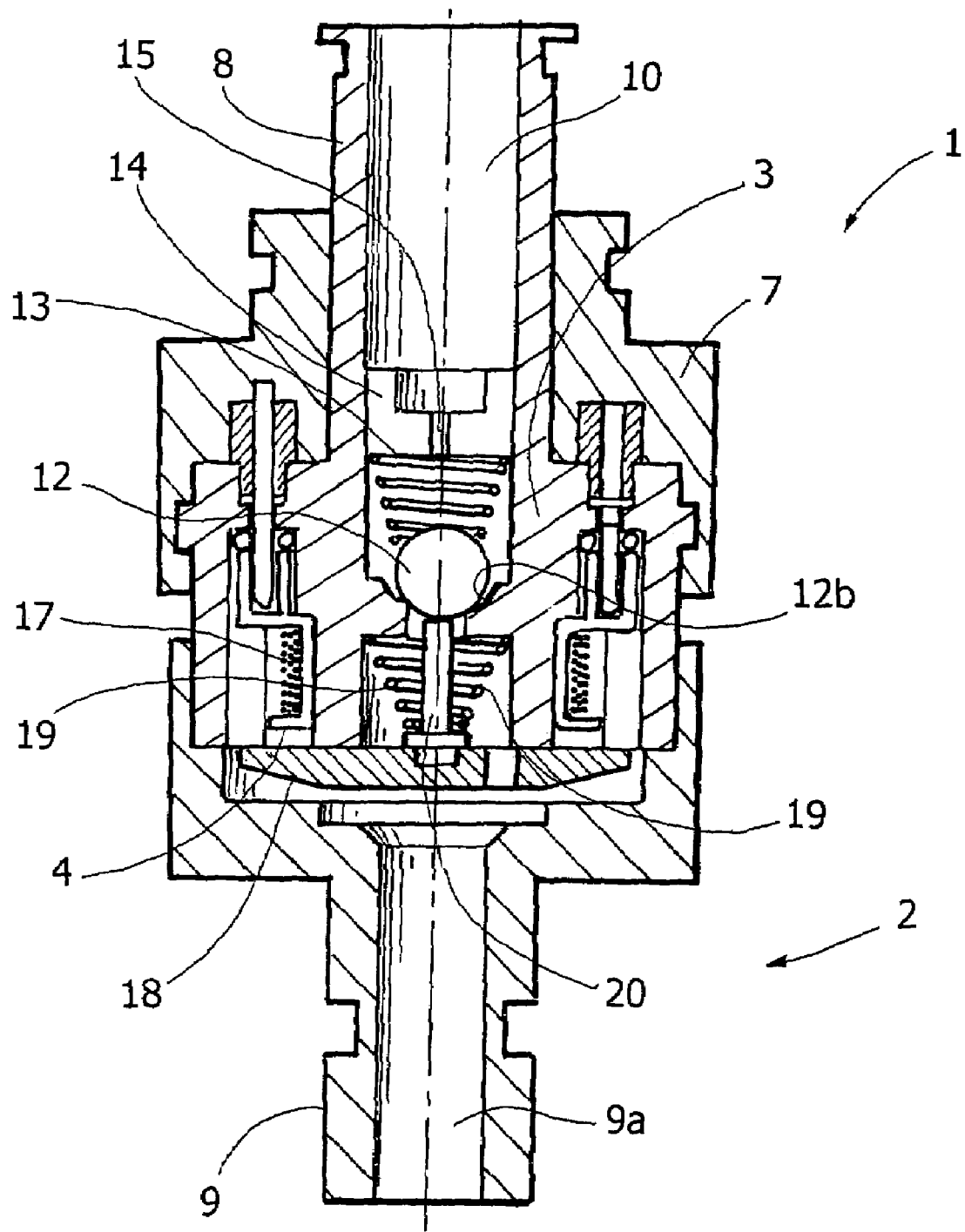
FIG. 3 shows a variant of the embodiment of FIG. 1.

FIG. 3 refers to a construction variant of the injector device shown in FIG. 1. In said figure, the same parts as those shown in FIG. 1 are referred to with the same number. Leaving aside the different structure of the valve body, as is evident from the drawings, the main difference consists in that the device of FIG. 3 is equipped with a sphere shutter cooperating with a conical valve seat 12b. As for the rest, the embodiment of FIG. 3 resembles on a functional level the one of FIG. 1, except for the different shape of the various elements constituting it.

Figure 4:
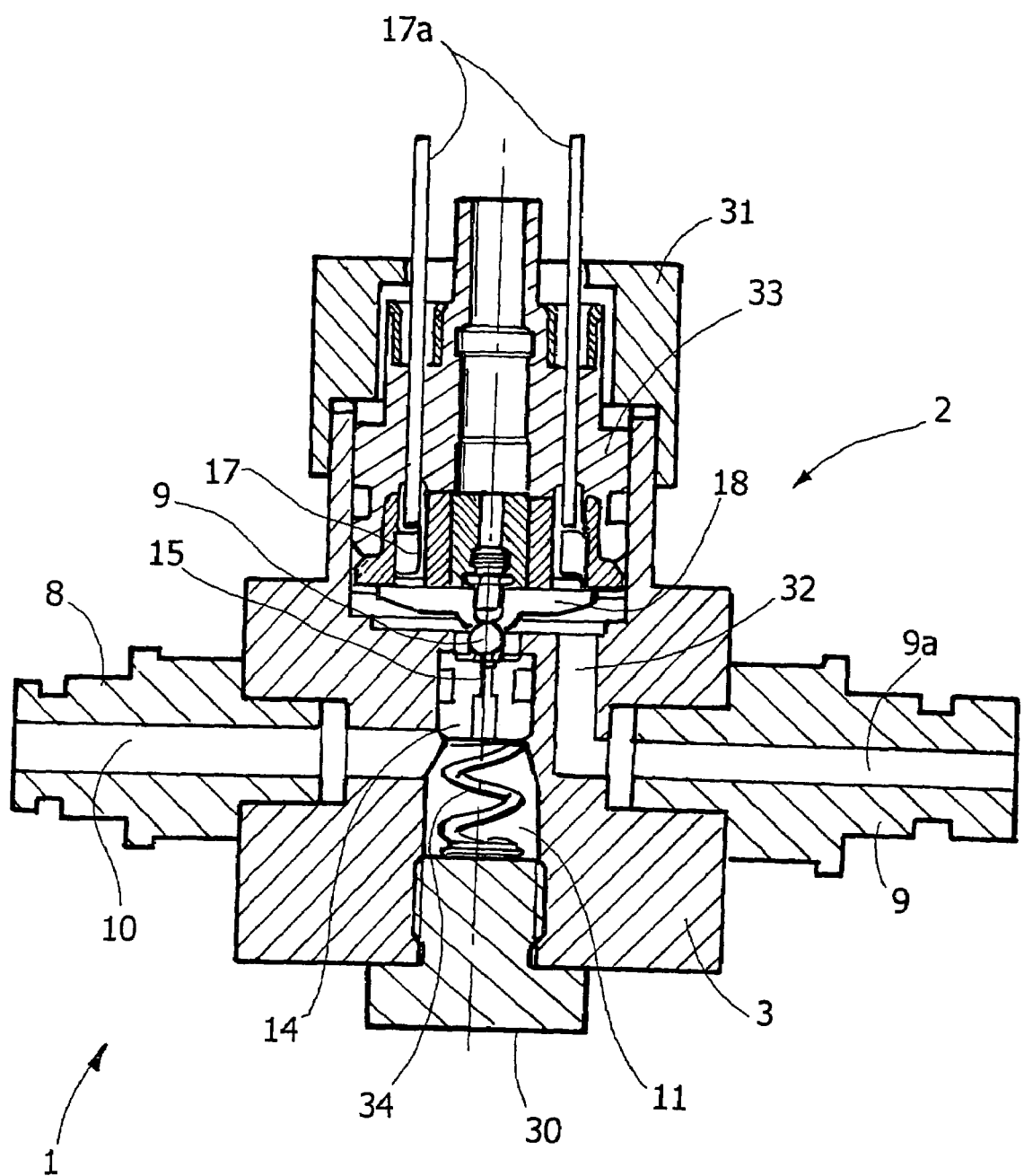
FIG. 4 shows a second embodiment of the device according to the invention.

Eventually, FIG. 4 shows a further embodiment in which the axis of the solenoid 17, instead of coinciding with the common axis of inlet and outlet connections 8, 9, as in the case of FIGS. 1, 3, is orthogonal to the latter. Again, in FIG. 4 the components corresponding to those shown in FIGS. 1 and 3 are referred to with the same number. As can be seen, the connections 8, 9 are defined by elements mounted on opposite faces of the element 3, whereas the solenoid 17 with its ends 17a is placed inside a body 33 housed in a cylindrical seat defined by the element 3 and blocked in position by means of a further element 31 mounted onto the element 3. A closing element 30 for the inner cavity 11 is fastened, for instance screwed, onto the end of the element 3 opposite the one with the element 31. Said cavity is in direct communication with the channel 10 of the inlet connection 8 and faces a bushing 14 with the gauged metering hole 15, which bushing is held in position by a spring 34 placed between the bushing 14 and the closing element 30. The gauged hole 15 ends above into a broadened cavity of the bushing 14, which acts as seat for the shutter 12, basically spherical and connected directly to the anchor 18. The latter is controlled by the solenoid 17, which is mounted, as was already mentioned, inside the element 3 in such a position that the solenoid axis is orthogonal to the axis of the channel 10 of the inlet connection 8, and—as shall be seen—to the axis of the channel of the outlet connection 9. When the solenoid is actuated, it attracts the anchor 18 "pulling" the shutter 12 upwards, so as to open the communication between the cavity 11 and a hole 32 communicating with the channel 9a of the outlet 9, which is coaxial to the channel 10, on the opposite side of the element 3.

As is evident, the embodiment of FIG. 4 preserves all the advantages referred to above despite the different shape and arrangement of the elements constituting the device.

Obviously, though the basic idea of the invention remains the same, construction details and embodiments can widely vary with respect to what has been described and shown by mere way of example, however without leaving the framework of the present invention.

What is claimed is:

1. Fuel injector device for an internal combustion engine, comprising:
   a valve body, having an inlet designed to be connected to a source of pressurized fuel and an outlet designed to be connected with engine intake, a shutter cooperating with a corresponding valve seat so as to check the communication between said inlet and said outlet, elastic means holding the shutter in its closing position, a solenoid actuator comprising a solenoid and a moveable anchor for causing a shift of the shutter towards its opening position, metering means with gauged hole for metering the amount of fuel getting out of the injector device when the shutter is open, wherein said metering means with gauged hole are separated with respect to said shutter and to the valve seat cooperating with it.

2. Injector device according to claim 1, wherein said metering means with gauged hole are placed upstream, referring to fuel flow direction, from said shutter and from the seat cooperating with it.

3. Injector device according to claim 2, wherein the solenoid for controlling the shutter is placed downstream, referring to fuel flow direction, from the shutter, therefore in a low pressure environment and without problems concerning sealing towards outside.

4. Injector device according to claim 3, wherein said anchor faces an end of the solenoid and is attracted against said end when the solenoid is actuated.

5. Injector device according to claim 4, wherein said anchor is stiffly connected to the shutter and is arranged so as to pull the shutter towards its opening position when the solenoid is actuated.

6. Injector device according to claim 4, wherein said anchor is equipped with a bar for pushing the shutter towards its opening position when the solenoid is actuated.

7. Injector device according to claim 1, wherein said inlet and said outlet are basically lined up on the same axis, which substantially coincides with the axis of the solenoid.

8. Injector device according to claim 1, wherein said inlet and said outlet are basically lined up on an axis orthogonal to the axis of the solenoid.

9. Injector device according to claim 1, wherein at said metering means with gauged hole comprise a disk or bushing with an axial hole including at least a portion having a gauged diameter.

10. Injector device according to claim 9, wherein said disk or bushing is blocked inside a corresponding seat in the valve body.

11. Fuel injector device for an internal combustion engine, comprising:

a valve body, having an inlet designed to be connected to a source of pressurized fuel and an outlet designed to be connected with engine intake, a shutter cooperating with a corresponding valve seat so as to check the communication between said inlet and said outlet, elastic means holding the shutter in its closing position, a solenoid for causing a shift of the shutter towards its opening position, metering means with gauged hole for metering the amount of fuel getting out of the injector device when the shutter is open, wherein said metering means with gauged hole are separated with respect to said shutter and to the valve seat cooperating with it;

wherein said metering means with gauged hole comprise a disk or bushing with an axial hole including at least a portion having a gauged diameter; and wherein said disk or bushing is held in its seat inside the valve body by a spring.

12. Fuel injector device for an internal combustion engine, comprising:

a valve body, having an inlet designed to be connected to a source of pressurized fuel and an outlet designed to be connected with engine intake, a shutter cooperating with a corresponding valve seat so as to check the communication between said inlet and said outlet, elastic means holding the shutter in its closing position, a solenoid actuator for causing a shift of the shutter towards its opening position, metering means with gauged hole for metering the amount of fuel getting out of the injector device when the shutter is open, wherein said metering means with gauged hole are separated with respect to said shutter and to the valve seat cooperating with it; and wherein said solenoid actuator includes a solenoid and a moveable anchor which faces an end of the solenoid and is attracted against said end when the solenoid is actuated.

* * * * *